United States Patent
Lee et al.

(10) Patent No.: US 9,001,640 B1
(45) Date of Patent: **\*Apr. 7, 2015**

(54) TRANSMIT DIVERSITY TECHNIQUE BASED ON CHANNEL RANDOMIZATION FOR ORTHOGONAL FREQUENCY DIVISION MULTIPLEXING SYSTEMS

(71) Applicant: Marvell International LTD., Hamilton (BM)

(72) Inventors: Jungwon Lee, San Diego, CA (US); Hui-Ling Lou, Sunnyvale, CA (US)

(73) Assignee: Marvell International Ltd., Hamilton (BM)

( \* ) Notice: Subject to any disclaimer, the term of this patent is extended or adjusted under 35 U.S.C. 154(b) by 0 days.

This patent is subject to a terminal disclaimer.

(21) Appl. No.: 14/281,368

(22) Filed: May 19, 2014

Related U.S. Application Data

(63) Continuation of application No. 13/278,893, filed on Oct. 21, 2011, now Pat. No. 8,730,789, which is a continuation of application No. 12/643,169, filed on Dec. 21, 2009, now Pat. No. 8,045,450, which is a continuation of application No. 11/204,069, filed on Aug. 15, 2005, now Pat. No. 7,636,297.

(60) Provisional application No. 60/650,700, filed on Feb. 7, 2005.

(51) Int. Cl.
   *H04J 11/00* (2006.01)
   *H04L 1/06* (2006.01)
   *H04B 7/04* (2006.01)

(52) U.S. Cl.
   CPC ............ *H04L 1/0606* (2013.01); *H04B 7/0413* (2013.01)

(58) Field of Classification Search
   USPC ......... 370/203, 206, 207, 208, 210, 215, 204, 370/211; 375/239; 455/39, 42, 45, 101, 108
   See application file for complete search history.

(56) References Cited

U.S. PATENT DOCUMENTS

| | | | | |
|---|---|---|---|---|
| 5,544,167 | A | \* | 8/1996 | Lucas et al. ................... 370/342 |
| 7,099,270 | B2 | \* | 8/2006 | Yamaguchi ................... 370/208 |
| 7,154,939 | B2 | | 12/2006 | Hamied et al. |
| 7,248,625 | B2 | | 7/2007 | Chien |

(Continued)

OTHER PUBLICATIONS

Dammann, Armin, et al., "Standard Comfortable Antenna Diversity Technique for OFDM and Its Application to the DVB-T System," 2001. IEEE.

(Continued)

*Primary Examiner* — Chi H Pham
*Assistant Examiner* — Weibin Huang

(57) ABSTRACT

A physical layer device including a mapping module to map a plurality of data streams to a plurality of transmit antennas. Each transmit antenna is associated with a respective radio frequency channel. A first gain module communicates with a first transmit antenna, receives a first plurality of signals generated based on the plurality of data streams, and applies a first complex gain corresponding to the first transmit antenna to each of the first plurality of signals. A second gain module communicates with a second transmit antenna, receives a second plurality of signals generated based on the plurality of data streams, and applies a second complex gain corresponding to the second transmit antenna to each of the second plurality of signals. The second plurality of signals is different than the first plurality of signals. The second complex gain is different than the first complex gain.

20 Claims, 10 Drawing Sheets

(56) References Cited

U.S. PATENT DOCUMENTS

| | | |
|---|---|---|
| 7,411,897 B2 | 8/2008 | Yoo et al. |
| 7,418,049 B2 | 8/2008 | Wallace |
| 8,045,450 B1 | 10/2011 | Lee et al. |
| 8,730,789 B1 * | 5/2014 | Lee et al. ............... 370/208 |
| 2003/0223353 A1 * | 12/2003 | Wallace ............... 370/206 |
| 2005/0003768 A1 * | 1/2005 | Laroia et al. ............... 455/101 |
| 2005/0085269 A1 | 4/2005 | Buljore et al. |

OTHER PUBLICATIONS

Sampath, Hemanth, et al., "A Simple Scalable Space-Frequency Coding Scheme for MIMO-OFDM," 2004, IEEE.

* cited by examiner

TRANSMIT DIVERSITY TECHNIQUE BASED ON CHANNEL RANDOMIZATION FOR ORTHOGONAL FREQUENCY DIVISION MULTIPLEXING SYSTEMS

CROSS-REFERENCE TO RELATED APPLICATIONS

This application is a continuation of U.S. patent application Ser. No. 13/278,893 (now U.S. Pat. No. 8,730,789), filed Oct. 21, 2011 which is a continuation of U.S. patent application Ser. No. 12/643,169 (now U.S. Pat. No. 8,045,450), filed Dec. 21, 2009, which is a continuation of U.S. patent application Ser. No. 11/204,069 (now U.S. Pat. No. 7,636,297), filed Aug. 15, 2005, which claims priority to U.S. Provisional Patent Application No. 60/650,700, filed Feb. 7, 2005, which are hereby incorporated herein by reference in their entirety.

FIELD OF THE INVENTION

The present invention relates to transmit diversity techniques for multi-input, multi-output (MIMO) orthogonal frequency division multiplexing (OFDM) transmitters.

BACKGROUND OF THE INVENTION

Turning now to FIG. 1, a wireless communication system 10 is shown. The system 10 includes a source module 12 that provides digital data to an interface 14. The digital data can represent assorted types of information, such as audio, video, computer data and/or programs. The interface 14 buffers and/or streams the digital data to a media access controller (MAC) 16. The MAC 16 formats the digital data into a data stream. In some embodiments, the MAC 16 can also be configured to encode the data stream with a forward error correcting (FEC) code. The MAC 16 communicates the coded data stream to a physical layer (PHY) 18. The PHY 18 includes a plurality of transmit antennas 20-1, 20-2, ..., 20-T, referred to collectively as transmit antennas 20. The PHY 18 modulates the coded data stream onto a plurality of OFDM subchannels that are transmitted by the transmit antennas 20.

The transmitted OFDM subchannels propagate through a communication channel 22. The communication channel 22 provides a plurality of paths, which are represented by arrows, between the transmit antennas 20 and receive antennas 24-1, 24-2, ..., 24-R, referred to collectively as receive antennas 24. A signal propagation of each path can vary from the others in regard to attenuation, noise, multi-path fading, and other factors. These factors adversely affect a signal-to-noise ratio (SNR) in the subchannels as they are received at the receive antennas 24. The FEC facilitates decoding the received signal in the event that one or more paths reduce the SNR of one or more subchannels to the extent that they can no longer be successfully demodulated.

The receive antennas 24 communicate the received subchannels to a receive PHY 26. The receive PHY 26 demodulates the received subchannels into receive coded data stream and communicates it to a receive MAC 28. The receive MAC 28 extracts the digital data from the coded data stream and communicates it to a receive interface 30. The receive interface 30 buffers and streams the digital data to a destination module 32.

In some embodiments, the receive PHY 26 can use the spatial and/or SNR diversity of the receive antennas 24 and the communication paths, respectively, to compensate for, and/or minimize the effects of, the adverse factors in the communication channel 22. The PHY 18 can mitigate the adverse effect of multi-path fading by prepending a cyclic prefix to the data packet portion in each subchannel. The PHY 18 can also introduce diversity to the transmitted signals by adding a unique and constant cyclic delay to each subchannel.

Referring now to FIG. 2, a block diagram of a transmit PHY 50 is shown that uses such cyclic delay diversity (CDD). The PHY 50 receives a plurality of coded data streams 52-1, 52-2, ..., 52-$N_S$, referred to collectively as coded data streams 52.

Each of the coded data streams 52 is communicated to an input of a corresponding serial-to-parallel converter (S2P) module 54-1, 54-2, ..., 54-$N_S$, referred to collectively as S2P modules 54. Outputs of each S2P module 54 communicate with corresponding inputs of a mapping module 56. The mapping module 56 has a plurality of mapping module outputs 58-1, 58-2, ..., 58-$N_T$, referred to collectively as mapping module outputs 58. Each mapping module output 58 communicates with an input of a corresponding RF channel 60-1, 60-2, ..., 60-$N_T$, referred to collectively as RF channels 60.

The mapping module 56 maps the coded data streams to the mapping module outputs 58 according to a mapping matrix W[k], such as a Walsh or Fourier matrix. The variable k represents a subcarrier index of one RF channel 60 and k=0, 1, ..., N−1, where N represents a total number of OFDM subcarriers. The mapping matrix W[k] can be chosen as $$W[k] = \frac{1}{\sqrt{N_T}}[1 1 \ldots 1]^T$$

when only one coded data stream 52 is being used. When a plurality of coded data streams 52 are being used, i.e., $N_S \geq 2$ where $N_S$ represents the number of coded data streams 52, the mapping matrix W[k] can be chosen as the first $N_S$ columns of a unitary matrix of dimension $N_T \times N_T$, such as a Hardamard matrix or a Fourier matrix, where $N_T$ represents the number of RF channels 60 being used.

Each mapping module output 58 communicates with an input of a corresponding inverse fast-fourier transform (IFFT) module 62-1, 62-1, ..., 62-$N_T$, referred to collectively as IFFT modules 62. The IFFT modules 62 transform the coded data streams from the frequency domain to the time domain. Each IFFT module 62 communicates its coded data stream to an input of a corresponding parallel-to-serial (P2S) converter 64-1, 64-1, ..., 64-$N_T$, referred to collectively as P2S converters 64. With the exception of the first RF channel 60-1, outputs of the P2S converters 64 communicate the coded data streams to the inputs of corresponding cyclic delay modules 66-2, ..., 66-$N_T$. Each cyclic delay module 66 adds the respective unique and constant cyclic delay to the corresponding coded data stream. The cyclic delays simulate spatial diversity between the transmit antennas by staggering modulation of the transformed data streams. The first RF channel 60-1 does not include a cyclic delay module 66 and effectively has a cyclic delay equal to zero.

Each of the cyclic delay modules 66-2, ..., 66-$N_T$ communicates the corresponding coded data stream to a corresponding input of a cyclic prefix module 68-2, ..., 68-$N_T$. In the case of RF channel 60-1, the output of P2S converter 64-1 communicates the coded data stream to an input of a cyclic prefix module 68-1. The cyclic prefix modules 68-1, 68-2, ..., 68-$N_T$ are referred to collectively as cyclic prefix modules 68. The cyclic prefix modules 68 prepend a cyclic prefix, which includes the last samples of the output of the corresponding IFFT module 62, to each corresponding coded data stream. A duration of the cyclic prefix is preferably greater than a predetermined difference in multi-path propagation arrival times at the receiver.

An output 70-1, 70-2, ..., 70-$N_T$ of each of the cyclic prefix modules 68 communicates its coded data stream to respective D2A modules. An RF transmitter portion (not shown) of the PHY 50 then wirelessly transmits the coded data streams to the receiver. The transmit signals at the outputs 70 are respectively identified by the algebraic symbols $x_1, x_2, \ldots, x_{Nt}$.

Referring now to FIG. 3, a block diagram of a transmit PHY 100 is shown. The PHY 100 uses a permuted space-frequency coding (PSFC) technique to achieve transmit diversity. The PHY 100 is similar to the PHY 50 with the exception of the mapping matrix W[k] and omission of the cyclic delay modules 66. With the cyclic delay modules 66 omitted, the outputs of the P2S converters 64 communicate directly with the inputs of corresponding cyclic prefix modules 68.

The PSFC technique chooses the mapping W[k] matrix as follows. Let $I_m$ be an identity matrix of dimension m×m and $I_m^{(k)}$ be a matrix that is formed by circularly rotating the columns of $I_m$ to the left by k mod m. By way of non-limiting example, for m=3, $$I_3^{(0)} = \begin{bmatrix} 1 & 0 & 0 \\ 0 & 1 & 0 \\ 0 & 0 & 1 \end{bmatrix}, I_3^{(1)} = \begin{bmatrix} 0 & 0 & 1 \\ 1 & 0 & 0 \\ 0 & 1 & 0 \end{bmatrix}, I_3^{(2)} = \begin{bmatrix} 0 & 1 & 0 \\ 0 & 0 & 1 \\ 1 & 0 & 0 \end{bmatrix}, I_3^{(3)} = \begin{bmatrix} 1 & 0 & 0 \\ 0 & 1 & 0 \\ 0 & 0 & 1 \end{bmatrix},$$

etc.
such that
$I_3^{(0)} = I_3^{(3)} = I_3^{(6)} = \ldots$ and
$I_3^{(1)} = I_3^{(4)} = I_3^{(7)} = \ldots$ and
$I_3^{(2)} = I_3^{(5)} = I_3^{(8)} = \ldots$.

The mapping matrix W[k] is formed by taking the first $N_S$ columns of $$\frac{1}{\sqrt{N_S}} I_{N_T}^{(\lfloor \frac{k}{B} \rfloor)},$$

where B is a predetermined parameter selected to control the frequency selectivity of the corresponding RF channel 60.

It remains desirable in the art to provide alternative methods for providing transmit diversity such that OFDM receivers can minimize the effects the adverse factors have in the SNR of the received signals.

SUMMARY OF THE INVENTION

A physical layer (PHY) module is provided that includes $N_T$ radio frequency (RF) channels, each including a gain module that employs a time-varying gain. A mapping module includes $N_S$ inputs receiving corresponding ones of the $N_S$ data streams and $N_T$ outputs communicating with corresponding ones of the $N_T$ RF channels. A mapping matrix maps the $N_S$ data streams from the $N_S$ inputs to $N_T$ data streams at the $N_T$ outputs. $N_T$ and $N_S$ are integers greater than or equal to 2.

In other features, the mapping matrix implements a permuted space-frequency coding technique. The gain module can include a cyclic delay module that can apply a cyclic delay based on $$e^{j\frac{2\pi k \delta_t}{N}},$$

where k is an index of the subcarriers of a corresponding one of the $N_T$ RF channels, $\delta_t$ is an integer constant associated with a corresponding one of the $N_T$ RF channels, and N represents a total number of the subcarriers. The mapping matrix can be a unitary matrix.

In other features, the time-varying gain includes a complex gain including a magnitude component and a phase component. The gain modules can randomly select the complex gains such that the complex gains are uniformly distributed over a surface of an $N_T$-dimensional complex unit sphere. The gain modules can randomly select the complex gains such that the magnitude components are uniformly distributed over an interval of [0,1] and the phase components are uniformly distributed over an interval of $2\pi$ radians. The time-varying gain can include a complex gain including a fixed magnitude component and a time-varying phase component. The gain modules can randomly select the complex gains such that the phase components are uniformly distributed over an interval of $2\pi$ radians.

In other features, the time-varying gain includes a complex gain including a time-varying magnitude component and a fixed phase component. The gain modules can randomly select the complex gains such that the magnitude components are uniformly distributed over an interval of [0,1] and the phase components are unequal to each other. The phase components can be uniformly distributed over an interval of $2\pi$ radians.

In other features, each of the $N_T$ RF channels can include an inverse fast Fourier transform module that communicates with a corresponding one of the gain modules. Each of the $N_T$ RF channels can include a parallel-to-serial (P2S) module that communicates with a corresponding one of the inverse fast Fourier transform modules. Each of the $N_T$ RF channels can include a cyclic prefix module that communicates with a corresponding one of the parallel-to-serial (P2S) modules. $N_T$−1 of the RF channels can include a cyclic delay module that applies a cyclic delay to the corresponding one of the $N_T$ data streams. The $N_T$ RF channels can employ a single carrier frequency.

A method is disclosed that provides diversity in a physical layer (PHY) module. The method receives $N_S$ data streams and maps the $N_S$ data streams in accordance with a mapping matrix to $N_T$ data streams in corresponding $N_T$ radio frequency (RF) channels. The method also processes each of the $N_T$ data streams according to a corresponding time-varying gain. $N_T$ and $N_S$ are integers greater than or equal to 2.

In other features, the mapping matrix implements a permuted space-frequency coding technique. The time-varying gain can include a cyclic delay. The cyclic delay can be based on $$e^{j\frac{2\pi k \delta_t}{N}},$$

where k is an index of subcarriers of a corresponding one of the $N_T$ RF channels, $\delta_t$ is an integer constant associated with a corresponding one of the $N_T$ RF channels, and N represents a total number of the subcarriers. The mapping matrix can be a unitary matrix.

In other features, the time-varying gain can include a complex gain including a magnitude component and a phase component. The method can include randomly selecting the complex gains such that they are uniformly distributed over a surface of an $N_T$-dimensional complex unit sphere. The method can include randomly selecting the complex gains such that they are uniformly distributed over an interval of [0,1] and randomly selecting the phase components such that they are uniformly distributed over an interval of $2\pi$ radians.

In other features, the time-varying gain includes a complex gain including a fixed magnitude component and a time-varying phase component. The method can include randomly selecting the complex gain such that the phase components are uniformly distributed over an interval of $2\pi$ radians. The time-varying gain can include a complex gain including a time-varying magnitude component and a fixed phase component. The method can include randomly selecting the complex gains such that the magnitude components are uniformly distributed over an interval of [0,1] and the phase components are unequal to each other. The phase components can be uniformly distributed over an interval of $2\pi$ radians.

In other features, the method includes transforming the $N_T$ data streams from a frequency domain to a time domain. The method can also include converting the $N_T$ data streams from parallel data to serial data. The method can also include adding a cyclic prefix to each of the $N_T$ data streams. The method can also include applying a cyclic delay to $N_T-1$ of the $N_T$ data streams. The method can include employing a single carrier frequency in the $N_T$ RF channels.

A physical layer (PHY) module is provided that includes $N_T$ RF channel means for communicating and each including gain means for applying a time-varying gain to a corresponding one of $N_T$ data streams. The PHY module includes mapping means for mapping the $N_S$ data streams to the $N_T$ data streams, where $N_T$ and $N_S$ are integers greater than or equal to 2.

In other features, the mapping means implements a permuted space-frequency coding technique. The gain means can include delay means for applying a cyclic delay. The cyclic delay can be based on $$e^{j\frac{2\pi k \delta_t}{N}},$$

where k is an index of subcarriers of a corresponding one of the $N_T$ RF channel means, $\delta_t$ is an integer constant associated with a corresponding one of the $N_T$ RF channel means, and N represents a total number of the subcarriers. The mapping means can implement a unitary matrix.

In other features, the time-varying gain includes a complex gain including a magnitude component and a phase component. Each of the gain means can randomly select the complex gain such that the complex gains are uniformly distributed over a surface of an $N_T$-dimensional complex unit sphere. Each of the gain means can randomly select the complex gain such that the magnitude components are uniformly distributed over an interval of [0,1] and the phase components are uniformly distributed over an interval of $2\pi$ radians.

In other features, the time-varying gain can include a complex gain including a fixed magnitude component and a time-varying phase component. Each of the gain means can randomly select the complex gain such that the phase components of the gain modules are uniformly distributed over an interval of $2\pi$ radians. The time-varying gain can include a complex gain including a time-varying magnitude component and a fixed phase component. Each of the gain means can randomly select the complex gain such that the magnitude components are uniformly distributed over an interval of [0,1] and the phase components are unequal to each other. The phase components can be uniformly distributed over an interval of $2\pi$ radians.

In other features, each of the $N_T$ RF channel means includes an inverse fast Fourier transform means for communicating with a corresponding one of the means for applying a time-varying gain. Each of the $N_T$ RF channel means can include parallel-to-serial (P2S) means for communicating with a corresponding one of the inverse fast Fourier transform means. Each of the $N_T$ RF channel means can include cyclic prefix means for applying a cyclic prefix to a corresponding one of the $N_T$ data streams and for communicating with a corresponding one of the P2S means. $N_T-1$ of the RF channel means can include a corresponding cyclic delay means for applying a cyclic delay to a corresponding one of the $N_T$ data streams. The $N_T$ RF channels can employ a single carrier frequency.

A physical layer (PHY) module is provided that includes $N_T$ radio frequency (RF) channels each including N subcarriers and a gain module that employs N different amplitude gains. The PHY module further includes a mapping module including $N_S$ inputs receiving corresponding ones of $N_S$ data streams, $N_T$ outputs communicating with corresponding ones of the $N_T$ RF channels, and a mapping matrix that maps the $N_S$ data streams from the $N_S$ inputs to $N_T$ data streams at the $N_T$ outputs, where $N_T$, $N_S$, and N are integers greater than or equal to 2.

In other features, at least one of the $N_T$ RF channels further comprises a cyclic delay module. At least one cyclic delay module can apply a cyclic delay that is based on $$e^{j\frac{2\pi k \delta_t}{N}},$$

where k is an index of the subcarriers of a corresponding one of the $N_T$ RF channels and $\delta_t$ is an integer constant associated with a corresponding one of the $N_T$ RF channels. The mapping matrix can be a unitary matrix.

In other features, each gain module employs N complex gains each comprising one of the corresponding different amplitude gains and a phasephase shift. The phasephase shifts can be uniformly distributed over an interval of $2\pi$ radians.

In other features, the amplitude gains are uniformly distributed over an interval of [0,1]. The amplitude gains can be based on a sinusoidal function.

In other features, each of the $N_T$ RF channels can further include an inverse fast Fourier transform module that communicates with a corresponding one of the gain modules. Each of the $N_T$ RF channels can further include a parallel-to-serial (P2S) module that communicates with a corresponding one of the inverse fast Fourier transform modules. Each of the $N_T$ RF channels can further include a cyclic prefix module that concatenates a cyclic prefix to a corresponding one of the $N_T$ data streams.

A method provides diversity in a physical layer (PHY) module and includes receiving $N_S$ data streams and mapping the $N_S$ data streams in accordance with a mapping matrix to $N_T$ radio frequency (RF) channels each including N subcarriers. The method also includes processing each of the N subcarriers with a different amplitude gain, where $N_T$, $N_S$, and N are integers greater than or equal to 2.

In other features, the method further includes processing at least one of the $N_T$ RF channels with a cyclic delay. The cyclic delay can be based on $$e^{j\frac{2\pi k \delta_t}{N}},$$

where k is an index of the subcarriers of a corresponding one of the $N_T$ RF channels and $\delta_t$ is an integer constant associated with a corresponding one of the $N_T$ RF channels. The mapping matrix can be a unitary matrix.

In other features, the method also includes processing each of the $N_T$ RF channels with N complex gains comprising the N different amplitude gains and a phasephase shift. The method can also include uniformly distributing the phasephase shifts over an interval of $2\pi$ radians. The method can include uniformly distributing the amplitude gains over an interval of [0,1]. The amplitude gains can be based on a sinusoidal function.

In other features, the method includes transforming the $N_T$ data streams from a frequency domain to a time domain. The method can further include converting the $N_T$ data streams from parallel data to serial data. The method can further include concatenating a cyclic prefix to each of the $N_T$ data streams.

A physical layer (PHY) module is provided that includes $N_T$ radio frequency (RF) channel means for communicating and each including N subcarriers and gain means for employing N different amplitude gains, and mapping means for mapping the $N_S$ data streams to the $N_T$ data streams, where $N_T$, $N_S$, and N are integers greater than or equal to 2.

In other features, at least one of the $N_T$ RF channel means further comprises delay means for applying a cyclic delay. The cyclic delay can be based on $$e^{j\frac{2\pi k \delta_t}{N}},$$

where k is an index of the subcarriers of a corresponding one of the $N_T$ RF channel means and $\delta_t$ is an integer constant associated with a corresponding one of the $N_T$ RF channel means. The mapping means can implement a unitary matrix.

In other features, each gain means can employ N complex gains, each comprising one of the corresponding different amplitude gains and a phase shift. The phase shifts can be uniformly distributed over an interval of $2\pi$ radians. The amplitude gains can be uniformly distributed over an interval of [0,1]. The amplitude gains can be based on a sinusoidal function.

In other features, each of the $N_T$ RF channel means can further comprise inverse fast Fourier transform means for communicating with a corresponding one of the gain means. Each of the $N_T$ RF channel means can further include parallel-to-serial (P2S) means for communicating with a corresponding one of the inverse fast Fourier transform means. Each of the $N_T$ RF channel means can also include cyclic prefix means for concatenating a cyclic prefix to a corresponding one of the $N_T$ data streams.

In still other features, the methods described above are implemented by a computer program executed by one or more processors. The computer program can reside on a computer readable medium such as but not limited to memory, non-volatile data storage and/or other suitable tangible storage mediums.

Further areas of applicability of the present invention will become apparent from the detailed description provided hereinafter. It should be understood that the detailed description and specific examples, while indicating the preferred embodiment(s) of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
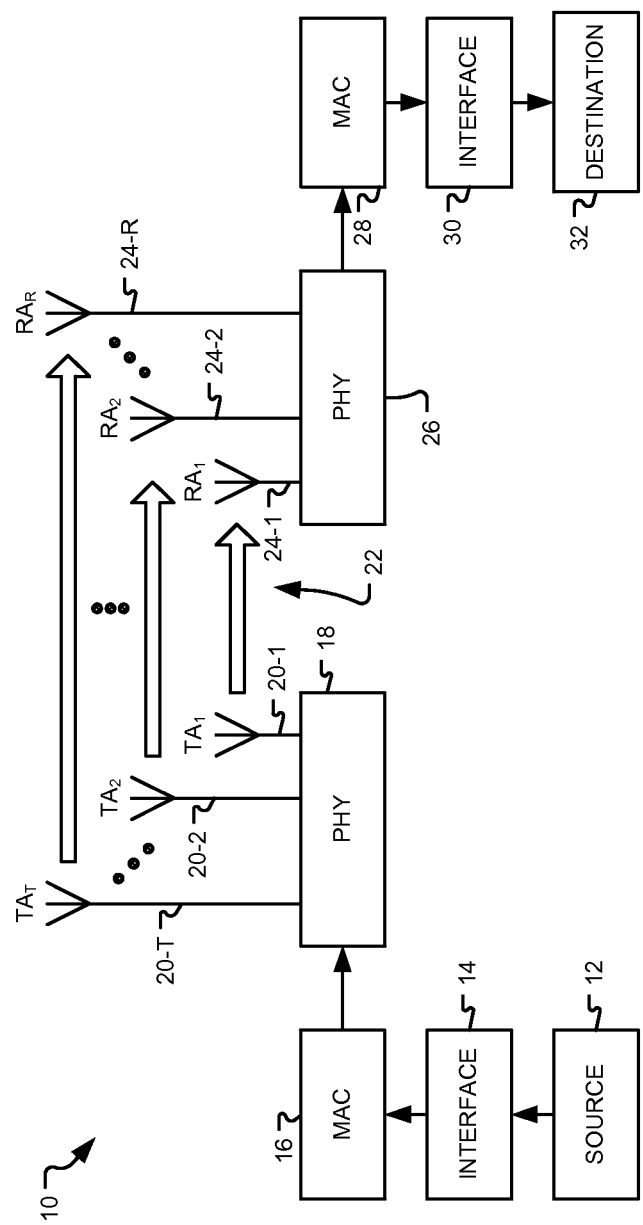
FIG. 1 is a functional block diagram of a multiple-input, multiple-output (MIMO) orthogonal frequency division multiplexed (OFDM) communication channel according to the prior art.
Figure 2:
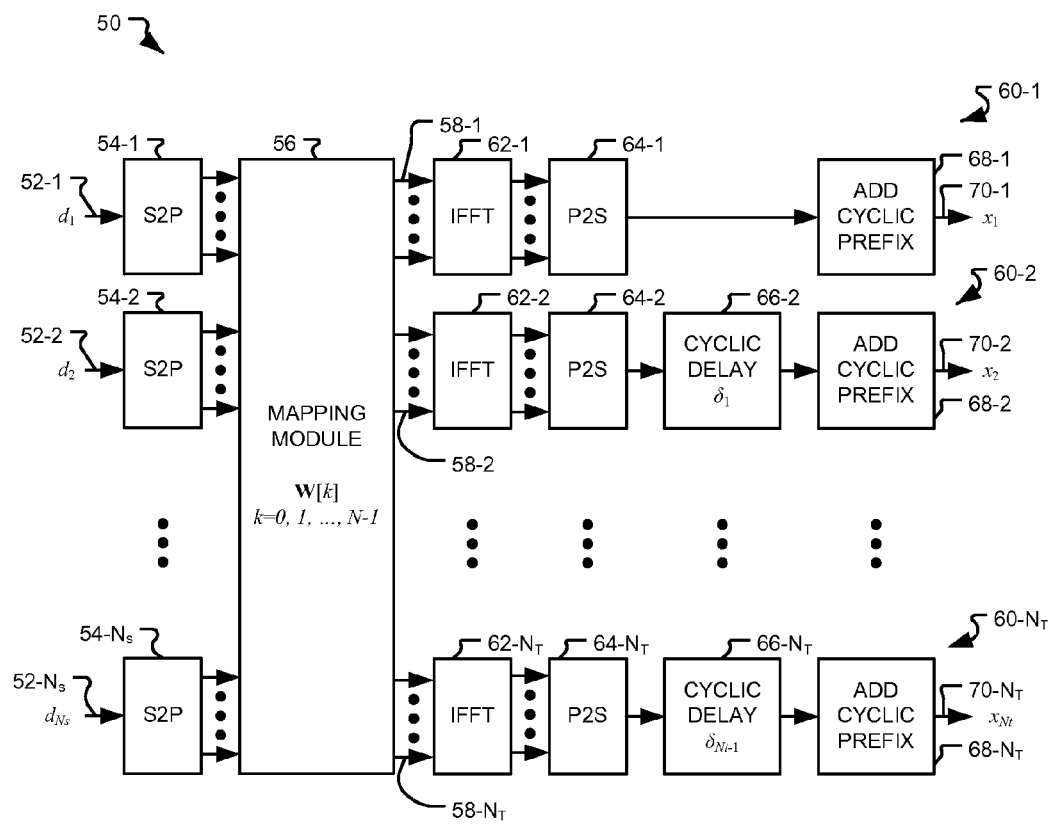
FIG. 2 is a functional block diagram of a MIMO OFDM transmit physical layer (PHY) that uses cyclic delay diversity (CDD) according to the prior art.
Figure 3:
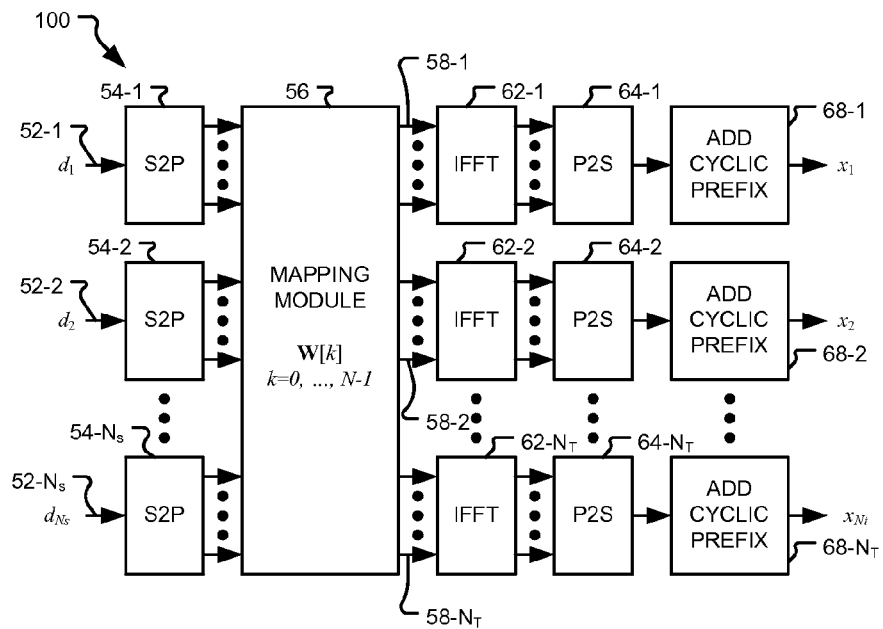
FIG. 3 is a functional block diagram of a MIMO OFDM transmit PHY that uses permuted space-frequency coding (PSFC) according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group), and memory that execute one or more software or firmware programs, a combinational logic circuit, and/or other suitable components that provide the described functionality. For purposes of clarity, the same reference numerals will be used to identify similar elements.

Figure 4A:
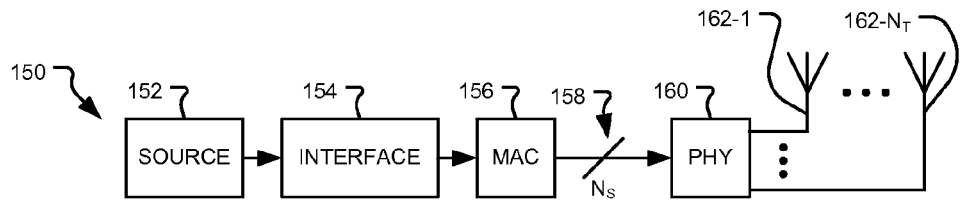
FIG. 4A is a functional block diagram of a MIMO OFDM transmission station.

Referring now to FIG. 4A, a functional block diagram is shown of a first type of MIMO OFDM transmission station 150. A source module 152 communicates digital data to an interface module 154. By way of non-limiting example, the interface module 154 can include a Media Independent Interface (MII). The interface module 154 buffers and streams the digital data to a media access layer module (MAC) 156. The MAC 156 formats the digital data into data packets and, in some embodiments, encodes the data packets using a forward error-correcting (FEC) code. The MAC 156 divides the coded data packets into one or more coded data streams 158 and communicates them to a physical layer module (PHY) 160. The number of coded data streams 158 is algebraically represented by $N_S$. The PHY 160, inter alia, maps the coded data streams 158 to one or more transmit antennas 162. The number of transmit antennas 162 is algebraically represented by $N_T$.

Figure 4B:
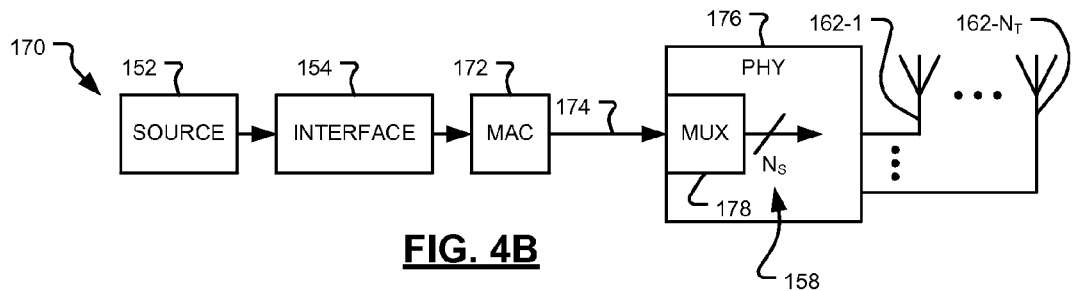
FIG. 4B is a functional block diagram of a MIMO OFDM transmission station that includes a multiplexer (MUX)

Referring now to FIG. 4B, a functional block diagram is shown of a second type of MIMO OFDM transmission station 170. The functional block diagrams of the first and second types of transmission stations 150, 170 are similar except for the output of the MAC 156 and the input of the PHY 160 (FIG. 4A). In the second type of transmission station 170, a MAC 172 communicates the coded data packets to a PHY 176 as a single coded data stream 174. The PHY 176 includes a multiplexer 178 that receives the single coded data stream 174 and divides it into the one or more coded data streams 158.

In addition to mapping the coded data streams 158 to the one or more transmit antennas 162, the first and second types of PHYs 160, 174 diversify the coded data streams 158 in accordance with methods described later herein.

Figure 5:
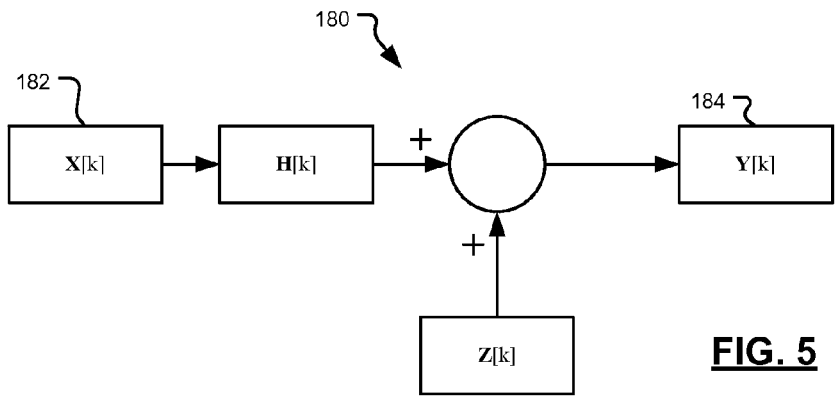
FIG. 5 is a system model of a noisy communication channel.

Referring now to FIG. 5, a system model is shown of a noisy communication channel 180. A transmission station 182 can include one of the first and second types of transmission stations 150, 170. The transmission station 182 transmits OFDM signals, which are referred to collectively as a transmit signal vector X[k]. The transmit signals X[k] are attenuated as they propagate through the communication channel 180. The attenuations of the transmit signals X[k] are represented by a channel gain matrix H[k]. Noise signals, which are represented by a noise vector Z[k], additively perturb the attenuated transmit signals. A receiving station 184 receives the noisy and attenuated transmit signals, which are represented by a receive signal vector Y[k].

For OFDM systems, the receive signals Y[k] can be expressed as $$Y[k]=H[k]X[k]+Z[k],$$

where $$Y[k] = [Y_1[k] \cdots Y_{N_R}[k]]^T,$$

$$H[k] = \begin{bmatrix} H_{1,1}[k] & \cdots & H_{1,N_T}[k] \\ \vdots & \ddots & \vdots \\ H_{N_R,1}[k] & \cdots & H_{N_R,N_T}[k] \end{bmatrix},$$

$$X[k] = [X_1[k] \cdots X_{N_T}[k]]^T,$$

$$Z[k] = [Z_1[k] \cdots Z_{N_R}[k]]^T,$$

where $X_t[k]$ is a transmit signal from a corresponding transmit antenna 162 t for an OFDM subcarrier k; $Z_r[k]$ is the noise in a receive antenna r for subcarrier k; $H_{r,t}[k]$ is a channel gain from the corresponding transmit antenna 162 t to the receive antenna r; and $N_R$ and $N_T$ are the number of receive and transmit antennas, respectively. $N_S$ is the number of coded data streams 158, which is preferably chosen such that $N_S \leq \min\{N_R, N_T\}$.

Transmit PHYs that are described later herein employ a linear precoding method that generates a transmit signal X[k] as follows:

$$X[k]=C[k]W[k]d[k],$$

where $X[k]=[X_1[k]X_2[k] \ldots X_{N_T}[k]]^T$,
$C[k]=\text{diag}([c_1[k]c_2[k] \ldots c_{N_T}[k]])$,
$d[k]=[d_1[k]d_2[k] \ldots d_{N_S}[k]]^T$, and where $c_t[k]$ is a complex gain for a single transmit antenna 162 t and OFDM subcarrier k; $d_s[k]$ is the data symbol for a single coded data stream s and subcarrier k; and $W[K] \in C^{N_T \times N_S}$ is a matrix that maps the $N_S$ coded data streams 158 of data symbols to the $N_T$ transmit antennas 162.

From the above, the receive signal can then be expressed as $$Y[k]=H[k]X[k]+Z[k]=H[k]C[k]W[k]d[k]+Z[k]=\tilde{H}[k]d[k]+Z[k],$$

where $\tilde{H}[k]=H[k]C[k]W[k]$.

The channel from the stream s to the receive antenna r can be expressed as $$\tilde{H}_{r,s}[k] = \sum_{n=1}^{N_T} H_{r,n}[k]c_n[k]w_{n,s}[k].$$

For the decoding of d[k], the receiving station 184 estimates the combined channel gain $\tilde{H}[k]$. Based on the estimate of the combined channel gain $\tilde{H}[k]$, the receiving station 184 can include conventional equalizers or employ a maximum likelihood (ML) method.

It should also be appreciated that a power of each antenna is limited by an average power constraint:

$$E\left[\sum_{k=0}^{N-1} |X_t[k]|^2\right] = \frac{P}{N_T}, \text{ for } t = 0, \ldots, N_T - 1,$$

where P is a maximum total power of the transmission station 182.

Figure 6:
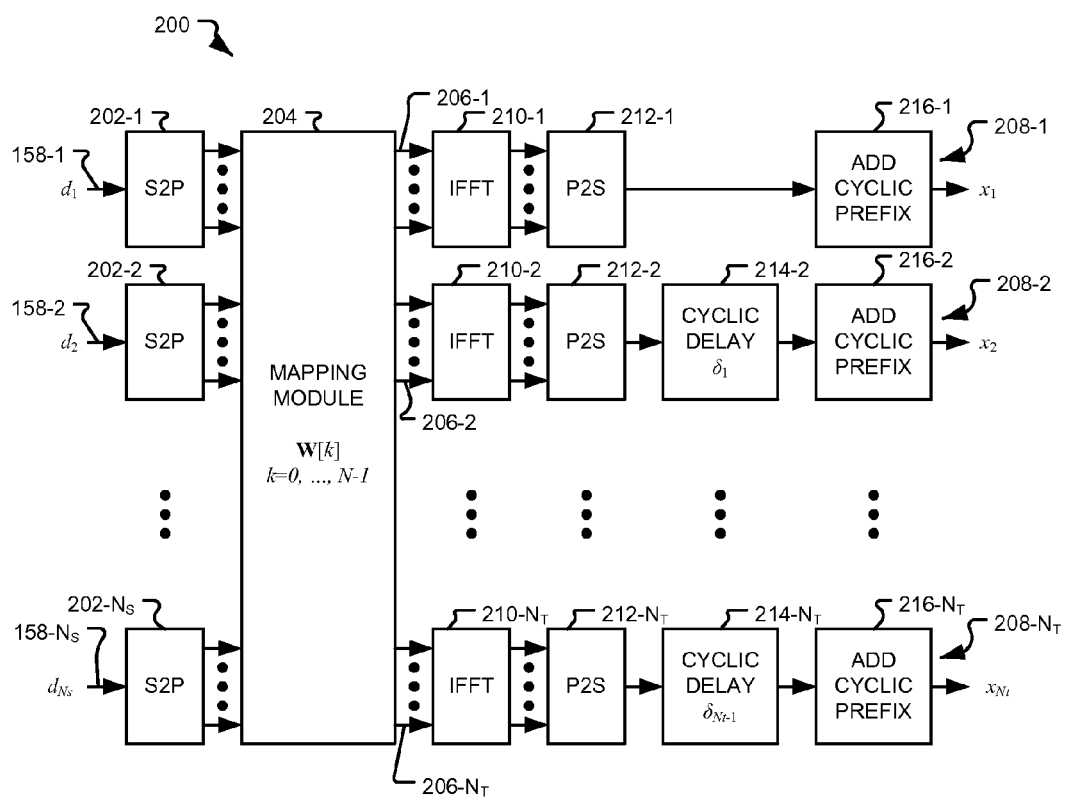
FIG. 6 is a functional block diagram of a MIMO OFDM transmit PHY that uses improved PSFC.

Referring now to FIG. 6, a functional block diagram is shown of a transmit PHY 200 that uses an improved PSFC technique. The PHY 200 receives the plurality of coded data streams 158, which are referred to individually as coded data streams 158-1, 158-2, ..., 158-$N_S$. Each coded data stream 158 is also associated with an algebraic variable $d_1, d_2, \ldots, d_{N_S}$, respectively. For the purpose of discussion, it will be assumed that the coded data streams 158 are generated as described in the MIMO OFDM transmission station 170 (FIG. 4B), however it is appreciated by those skilled in the art that the coded data streams 158 can be generated using other methods.

Each of the coded data streams 158 is communicated to an input of a corresponding serial-to-parallel converter (S2P) module 202-1, 202-2, ..., 202-$N_S$, referred to collectively as S2Ps 202. Outputs of each S2P module 202 communicate with corresponding inputs of a mapping module 204. The mapping module 204 has a plurality of mapping module outputs 206-1, 206-2, ..., 206-$N_T$, referred to collectively as mapping module outputs 206. Each mapping module output 206 communicates with an input of a corresponding RF channel 208-1, 208-2, ..., 208-$N_T$, referred to collectively as RF channels 208.

The mapping module 204 maps the coded data streams 158 mapping module outputs 206 according to a mapping matrix W[k]. The mapping matrix W[k] can be chosen as follows. Let $I_m$ be an identity matrix of dimension m×m and $I_m^{(k)}$ be a matrix that is formed by circularly rotating the columns of $I_m$ to the left by k mod m. By way of non-limiting example, for m=3, $$I_3^{(0)} = \begin{bmatrix} 1 & 0 & 0 \\ 0 & 1 & 0 \\ 0 & 0 & 1 \end{bmatrix}, I_3^{(1)} = \begin{bmatrix} 0 & 0 & 1 \\ 1 & 0 & 0 \\ 0 & 1 & 0 \end{bmatrix}, I_3^{(2)} = \begin{bmatrix} 0 & 1 & 0 \\ 0 & 0 & 1 \\ 1 & 0 & 0 \end{bmatrix}, I_3^{(4)} = \begin{bmatrix} 1 & 0 & 0 \\ 0 & 1 & 0 \\ 0 & 0 & 1 \end{bmatrix},$$

etc.

The mapping matrix W[k] is formed by taking the first $N_S$ columns of $$\frac{1}{\sqrt{N_S}} I_{N_T}^{(\lfloor \frac{k}{B} \rfloor)},$$

where B is a predetermined parameter selected to control the frequency selectivity of the corresponding RF channel 208. The mapping matrix W[k], for k=0, 1, . . . , N−1, can also be chosen as a function of time as well as the subcarrier index k.

Each mapping module output 206 communicates with a corresponding input of an inverse fast-fourier transform (IFFT) module 210-1, 210-2, . . . , 210-$N_T$, referred to collectively as IFFT modules 210. The IFFT modules 210 transform the corresponding coded data streams from the frequency domain to the time domain. Each IFFT module 210 communicates the corresponding coded data stream to an input of a corresponding parallel-to-serial (P2S) converter module 212-1, 212-2, . . . , 212-$N_T$, referred to collectively as P2S converter modules 64.

With the exception of the first RF channel 208-1, the output of each P2S converter module 212 communicates the corresponding coded data stream to the input of a corresponding cyclic delay module 214-2, . . . , 214-$N_T$. The first RF channel 208-1 does not include a cyclic delay module 214. Each cyclic delay module 214 adds a respective cyclic delay $\delta_t$ that simulates spatial diversity between the transmit antennas by staggering modulation of the OFDM subcarriers corresponding to each of the RF channels 208.

Figure 7:
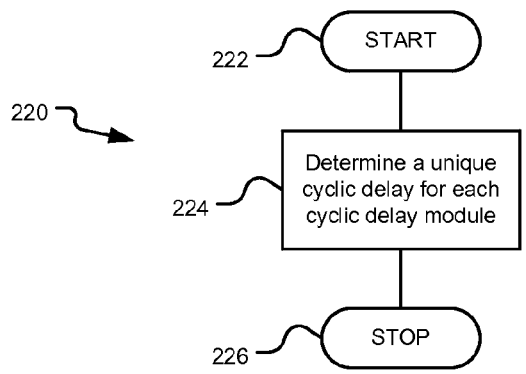
FIG. 7 is a flow chart of a method for determining time-varying cyclic delay values for the PHY of FIG. 6.

Referring to FIG. 7, a method 220 is shown for determining cyclic delay values. When the method 220 is executed, the cyclic delay values may be applied to the corresponding cyclic delay module 214 prior to the cyclic delay modules 214 receiving a frame vis-à-vis the coded data symbols from the mapping module 204. The method 220 begins at block 222. Control then proceeds to block 224 and determines the cyclic delay values.

The cyclic delay values can be chosen to be either time-varying or time-invariant. When the cyclic delay values are time invariant, each cyclic delay $\delta_t = I_t$ where I is an integer. When the cyclic delay values are time varying, each cyclic delay $\delta_t$ is chosen randomly over [0, $\delta_{max}$], where is $\delta_{max}$ a predetermined integer. After determining the cyclic delay values in block 224, control proceeds to block 226 and terminates. The first RF channel 208-1 effectively has a cyclic delay equal to zero because it does not include a cyclic delay module 214.

Returning now to FIG. 6, each of the cyclic delay modules 214 communicates the corresponding coded data stream to a corresponding input of a cyclic prefix module 216-2, . . . , 216-$N_T$. In the case of RF channel 208-1, the output of P2S converter 212-1 communicates the corresponding coded data stream directly to an input of a cyclic prefix module 216-1. The cyclic prefix modules 216-1, 216-2, . . . , 216-$N_T$ are referred to collectively as cyclic prefix modules 216. The cyclic prefix modules 216 prepend a cyclic prefix, which includes the last samples of the output of the corresponding IFFT module 210, to each of the corresponding coded data streams. A duration of the cyclic prefix is preferably greater than a predetermined difference in multi-path propagation arrival times at the receiver.

An output of each of the cyclic prefix modules 216 provides transmit signals that are respectively identified by the algebraic symbols $x_1, x_2, \ldots, x_{N_T}$. The transmit signals are then communicated to corresponding digital-to-analog converters (DACs) before they are transmitted by corresponding transmit antennas (not shown).

Figure 8:
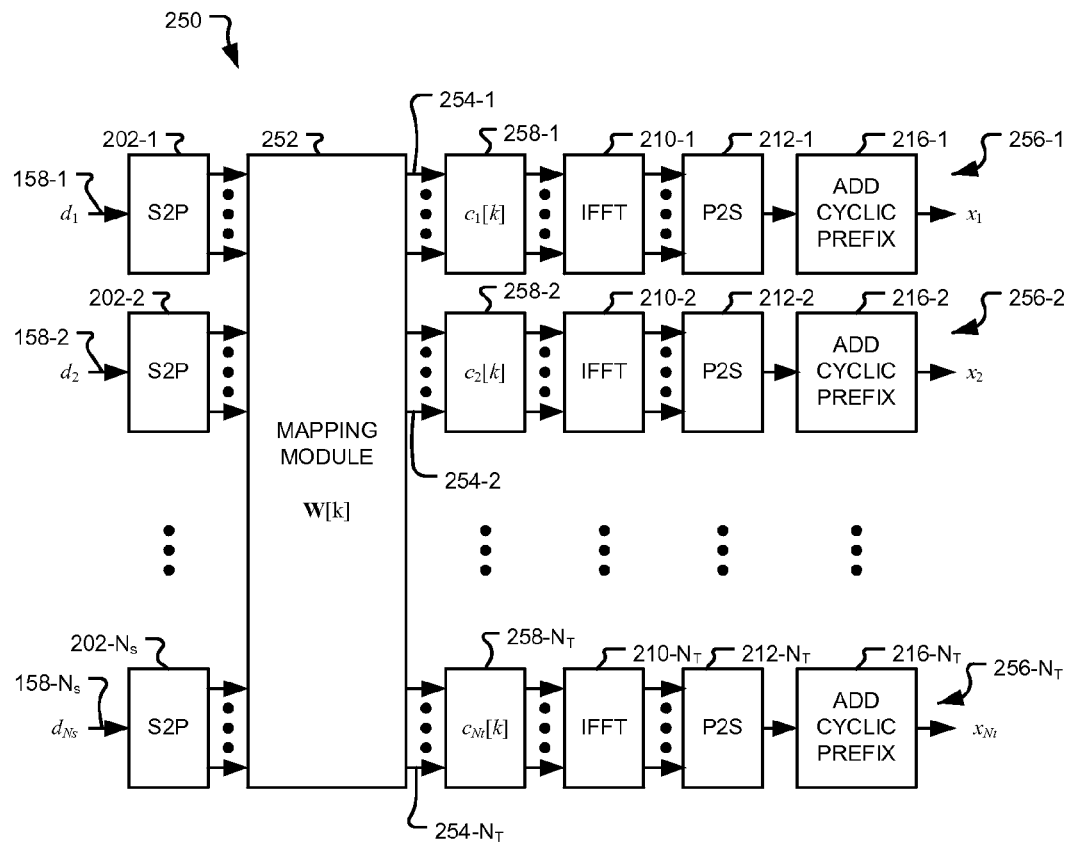
FIG. 8 is a functional block diagram of a MIMO OFDM transmit PHY that uses channel randomization.

Referring now to FIG. 8, a functional block diagram is shown of a transmit PHY 250 that uses channel randomization. The PHY 250 is similar to the PHY 200 except that a mapping module 252 uses an alternate mapping matrix W[k] and the cyclic delay modules 214 are omitted. Each RF channel 256-1, 256-2, . . . , 256-$N_T$ also includes a corresponding complex gain module 258-1, 258-2, . . . , 258-$N_T$ that communicates with the respective one of outputs 254-1, 254-2, . . . , 254-$N_T$ of the mapping module 252 and inputs of the respective IFFT modules 210. The complex gain modules 258 calculate and apply complex gains to the corresponding coded data streams according to methods described later herein.

In the mapping module 252, the mapping matrix W[k] can be provided by a unitary matrix whose elements have the same magnitude. The mapping matrix W[k] can be chosen as $$W[k] = \frac{1}{\sqrt{N_T}} [1 1 \ldots 1]^T$$

when only one coded data stream 158 is being used, i.e. $N_S=1$. When a plurality of coded data streams 158 are being used, i.e., $N_S \geq 2$, the mapping matrix W[k] can be chosen as the first $N_S$ columns of a unitary matrix of dimension $N_T \times N_T$ whose elements have the same magnitude, such as a Hardamard matrix or a Fourier matrix, where $N_T$ represents the number of transmit antennas 162 being used.

Figure 9:
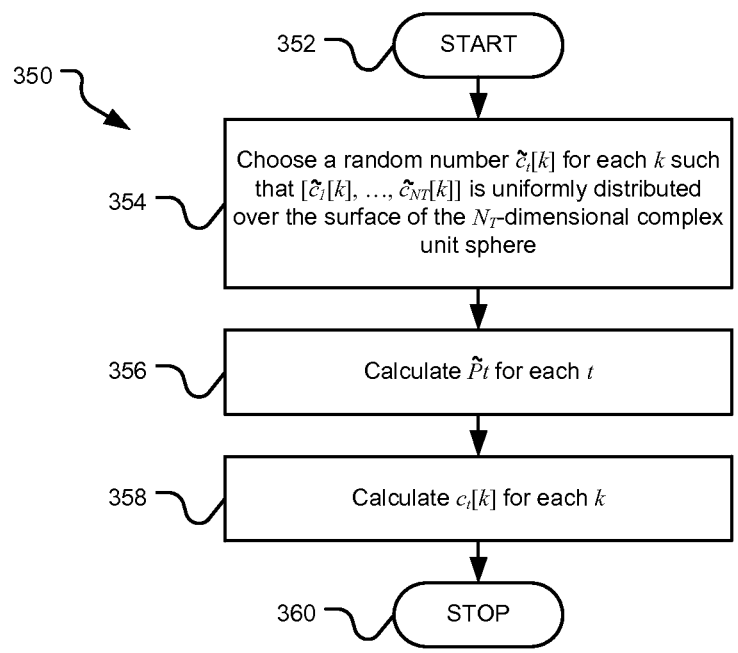
FIGS. 9-12 are flow charts of methods for determining gains for the PHY of FIG. 8.
Figure 10:
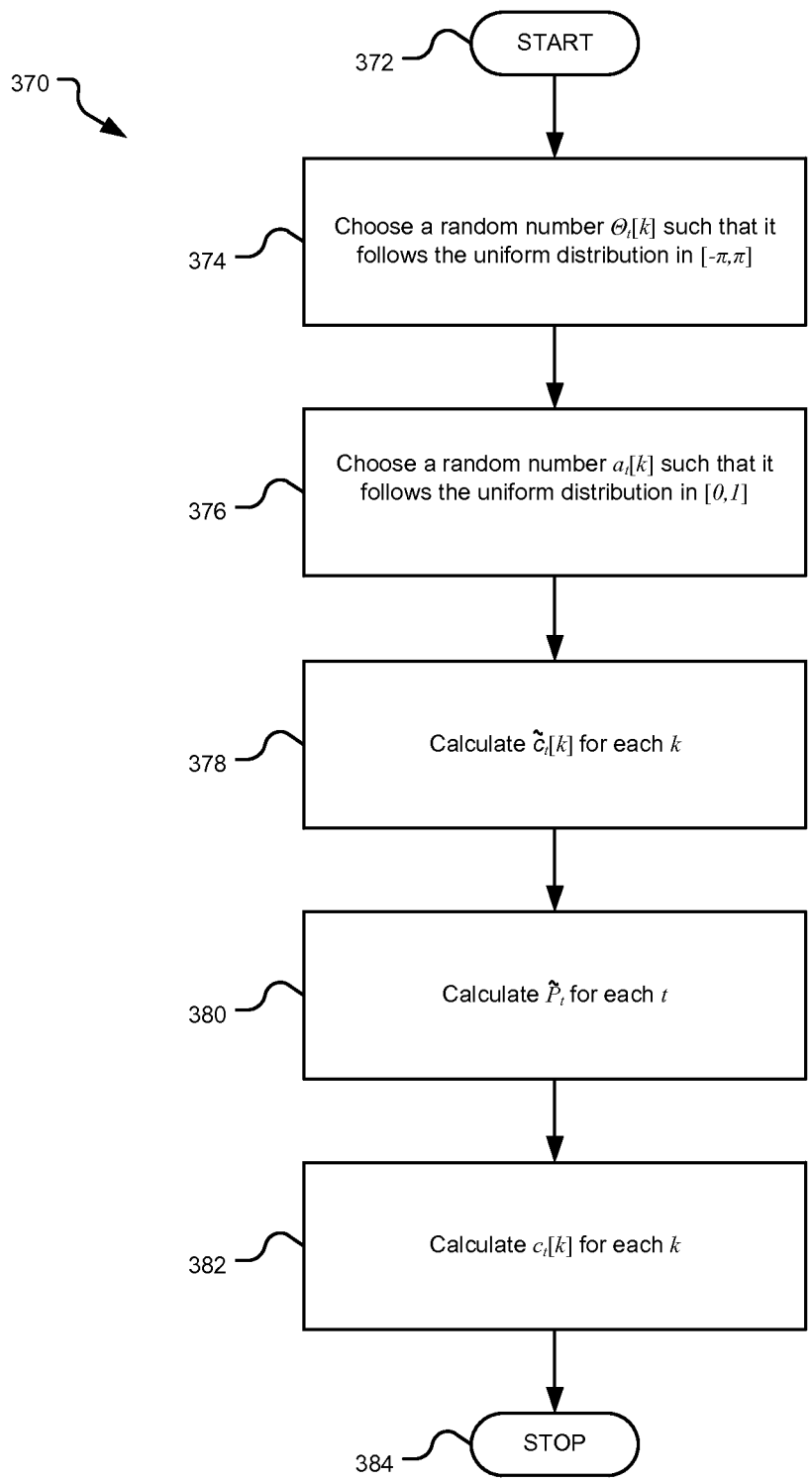
Figure 11:
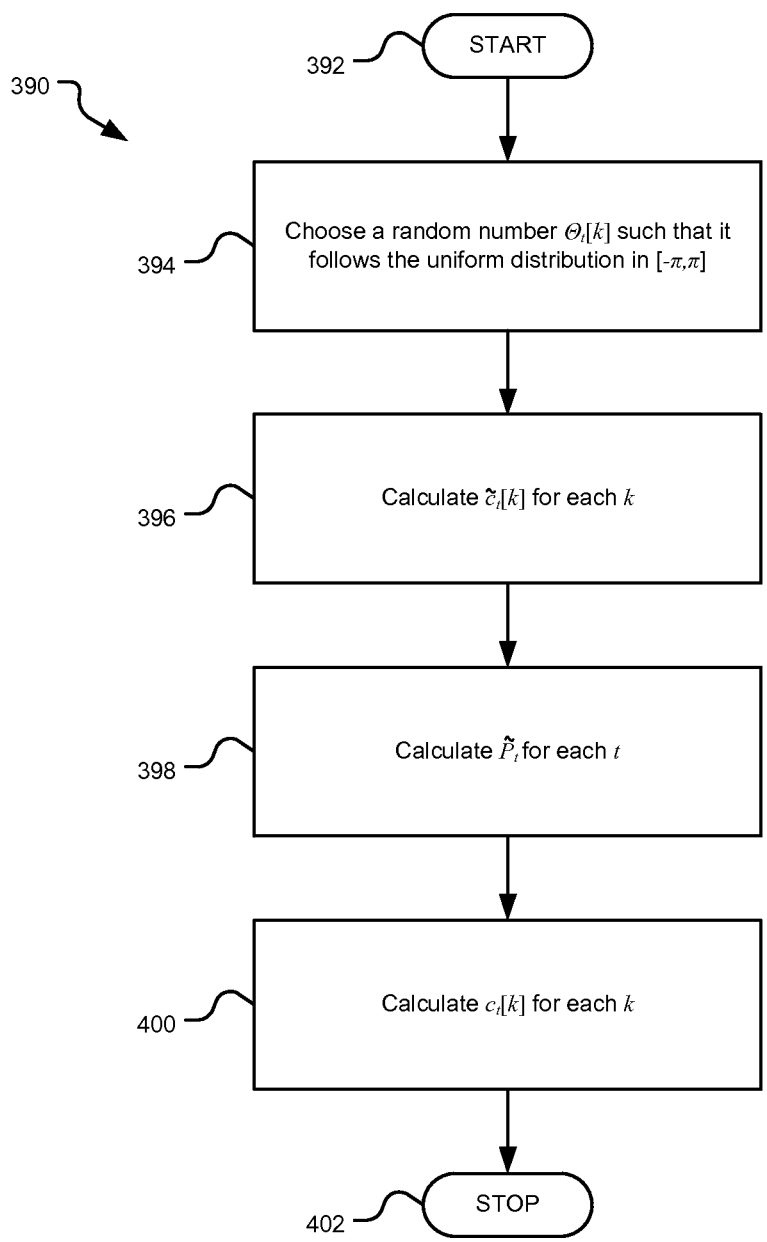

Referring now to FIGS. 9-11, various methods are shown for determining the gains $c_t[k]$. The methods can be executed periodically by the complex gain modules 258 and/or a microprocessor in the PHY 250. When the methods are executed, the gains $c_t[k]$ should be applied to the corresponding complex gain modules 258 prior to the complex gain modules 258 receiving a frame vis-à-vis the coded data symbols from the mapping module 252.

Referring now to FIG. 9, a first method 350 is shown for generating complex gains that are used by the complex gain modules 258 (FIG. 8). The method 350 can be executed periodically by a microprocessor included in the PHY, such as PHY 250. The method 350 begins at a start block 352. Control then proceeds to block 354 and chooses a random number $\tilde{c}_t[k]$ for each k such that $[\tilde{c}_1[k] \ldots \tilde{c}N_T[k]]$ is uniformly distributed over a surface of an $N_T$-dimensional complex unit sphere. Control then proceeds to block 356 and calculates $$\tilde{P}_t = \frac{N_S}{N_T} \sum_{k=0}^{N-1} |\tilde{c}_t[k]|^2 E[|d[k]|^2]$$

for each t, where E represents the average expectation function and d[k] represents a data symbol in the coded data stream of the $k^{th}$ subchannel. Control then proceeds to block 358 and multiplies each $\tilde{c}_t[k]$ by $$\sqrt{\frac{P}{\tilde{P}_t}}$$

to obtain complex gains $$c_t[k] = \sqrt{\frac{P}{\tilde{P}_t}} \tilde{c}_t[k]$$

that are used by each respective complex gain module 258. Control then proceeds to block 360 and terminates.

Referring now to FIG. 10, a method 370 is shown for generating random magnitude and phase values that are used by the complex gain modules 258. The method 370 can be executed by a microprocessor included in the chosen PHY, such as PHY 250 (FIG. 8). The method 370 begins at a start block 372. Control then proceeds to block 374 and chooses a random number $\theta_t[k]$ such that it follows the uniform distribution in $[-\pi,\pi]$. Control then proceeds to block 376 and chooses a random number at $a_t[k]$ such that it follows the uniform distribution in $[0,1]$. Control then proceeds to block 378 and sets each $\tilde{c}_t[k] = e^{j2\pi\theta_t[k]} a_t[k]$. Control then proceeds to block 380 and calculates $$\tilde{P}_t = \frac{N_S}{N_T} \sum_{k=0}^{N-1} |\tilde{c}_t[k]|^2 E[|d[k]|^2]$$

for each t. Control then proceeds to block 382 and multiplies each $\tilde{c}_t[k]$ by $$\sqrt{\frac{P}{\tilde{P}_t}}$$

to obtain to obtain complex gains $$c_t[k] = \sqrt{\frac{P}{\tilde{P}_t}} \tilde{c}_t[k]$$

that are used by each respective complex gain module 258. Control then proceeds to block 384 and terminates.

Referring now to FIG. 11, a method 390 is shown for generating constant magnitude and random phase values that are used by the complex gain modules 258. The method 390 can be executed by a microprocessor included in the chosen PHY, such as PHY 250 (FIG. 7). The method 390 begins at a start block 392. Control then proceeds to block 394 and chooses a random number $\theta_t[k]$ such that it follows a uniform distribution in $[-\pi,\pi]$. Control then proceeds to block 396 and sets each $\tilde{c}_t[k] = e^{j2\pi\theta_t[k]}$. Control then proceeds to block 398 and calculates $$\tilde{P}_t = \frac{N_S}{N_T} \sum_{k=0}^{N-1} |\tilde{c}_t[k]|^2 E[|d[k]|^2]$$

for each t. Control then proceeds to block 400 and multiply each $\tilde{c}_t[k]$ by $$\sqrt{\frac{P}{\tilde{P}_t}}$$

to obtain complex gains $$c_t[k] = \sqrt{\frac{P}{\tilde{P}_t}} \tilde{c}_t[k]$$

that are used by each respective complex gain module 258. Control then proceeds to block 402 and terminates.

It is appreciated by those skilled in the art that methods other than methods 350, 370, and 390 can be used to randomly generate the complex gains $c_t[k]$. While randomly generating the complex gains $c_t[k]$ achieves maximum diversity, the generation of the random values can require an undesirable amount of computational complexity.

Figure 12:
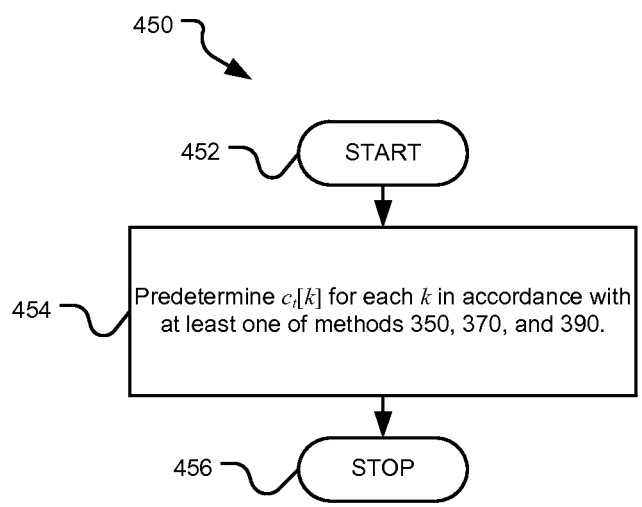

Referring now to FIG. 12, a method 450 is shown for generating predetermined values of $c_t[k]$. Method 450 reduces computational complexity when compared to methods 350, 370, and 390. The predetermined values of $c_t[k]$ can be stored in a memory that communicates with a microprocessor (not shown) included in the chosen PHY, such as PHY 250 (FIG. 7). The method 450 begins at start block 452. Control then proceeds to block 454 and chooses the complex gains $c_t[k]$ in accordance with at least one of the methods 350, 370, and 390. Control then proceeds to block 456 and terminates.

Figure 13:
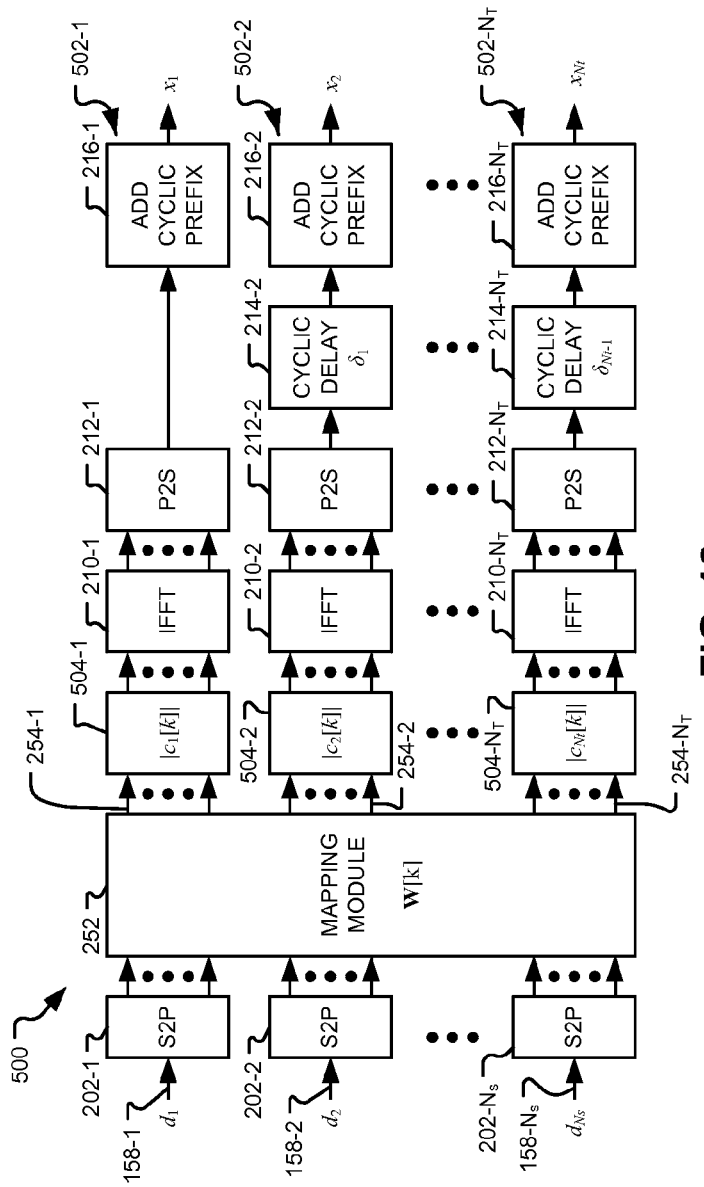
FIG. 13 is a functional block diagram of a MIMO OFDM transmit PHY that uses channel randomization in combination with cyclic delay.

Referring now to FIG. 13, a functional block diagram is shown of a transmit PHY 500 that uses channel randomization in combination with cyclic delay. The transmit PHY 500 is similar to the transmit PHY 250 except each of RF channels 502-1, 502-2, ..., 502-$N_T$, uses a corresponding alternate gain module 504-1, 504-2, ..., 504-$N_T$ in place of the complex gain modules 258. The alternate gain modules 504 apply only the magnitude portions of their respective gains to the coded data stream. The alternate gain modules 504 calculate gain magnitudes according to a method described later herein. The transmit PHY 500 also includes the cyclic delay modules 214-2, ..., 214-$N_T$ that communicate with the respective P2S modules 212-2, ..., 212-$N_T$ and the respective cyclic prefix modules 216-2, ..., 216-$N_T$. The cyclic delay modules apply cyclic delay values that can be generated according to a method described later herein.

Figure 14:
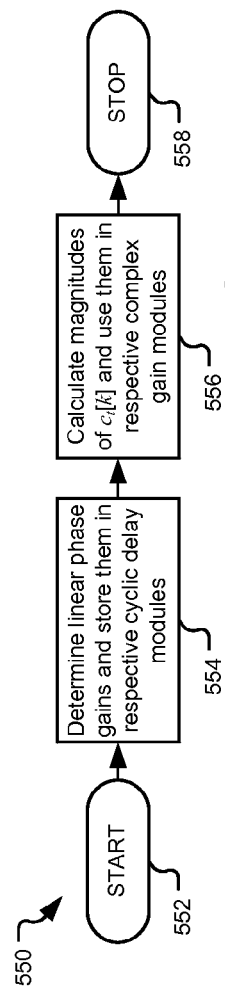
FIG. 14 is a flow chart of a method for determining gains for the PHY of FIG. 13.

Referring now to FIG. 14, a method 550 is shown for determining the cyclic delay values and gains for the PHY 500 (FIG. 13). The method 550 begins at block 552. Control then proceeds to block 554. In block 554, the cyclic delay values are calculated to provide predetermined linear phases $c_t[k]$ such that $$\angle c_t[k] = \frac{2\pi k \delta_t}{N}.$$

Each of the cyclic delay values are then implemented by a respective one of the cyclic delay modules 214. Control then proceeds to block 556 and periodically determines the gains. The gain modules 504 then apply the gains to their respective coded data stream. Control then proceeds to block 558 and terminates.

By way of non-limiting example, block 556 can execute the step of calculating the gains as follows. For IEEE 802.11n, $N_T=2$, and $N_S=1$, the gains can be provided by $$|c_1[k]| = \left|\cos\left(\frac{2\pi ak}{N}\right)\right| \text{ and } |c_2[k]| = \left|\sin\left(\frac{2\pi ak}{N}\right)\right|,$$

where a is an integer. Then with no cyclic delay for RF channel 502-1 and with the cyclic delay by $\delta_1$ for RF channel 502-2, $$c_1[k] = \left|\cos\left(\frac{2\pi ak}{N}\right)\right| \text{ and } c_2[k] = e^{j\frac{2\pi k\delta_1}{N}}\left|\sin\left(\frac{2\pi ak}{N}\right)\right|.$$

The gain equations $c_1[k]$ and $c_2[k]$ remain constant and provide a different gain for each corresponding RF channel 502 and OFDM subcarrier k.

Figure 15:
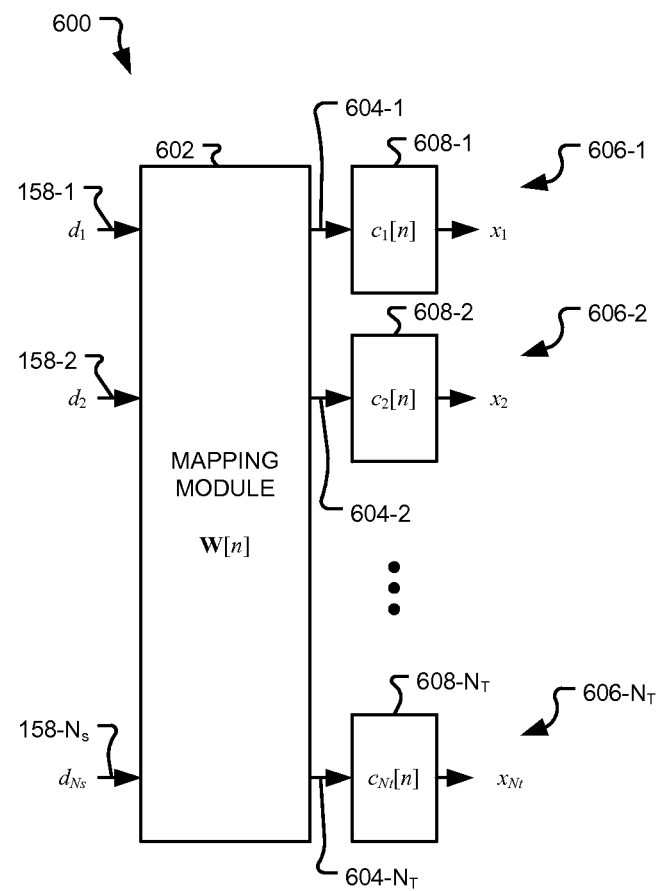
FIG. 15 is a functional block diagram of a single-carrier MIMO transmit PHY that uses time-varying gains.

Referring now to FIG. 15, a functional block diagram is shown of a single-carrier transmit PHY 600. The PHY 600 includes a mapping module 602 that receives the coded data streams 158. The mapping module 602 has a plurality of mapping module outputs 604-1, 604-2, ..., 604-$N_T$, referred to collectively as mapping module outputs 604. Each mapping module output 604 communicates with an input of a corresponding single-carrier RF channel 606-1, 606-2, ..., 606-$N_T$, referred to collectively as single-carrier RF channels 606.

The mapping module 602 maps the coded data streams 158 to the mapping module outputs 606 according to a mapping matrix W[n], where n is a time index. The mapping matrix W[n] can be a unitary matrix and derived in the same fashion as the mapping matrix 252 (FIG. 8.) A plurality of complex gain modules 608-1, 608-2, ..., 608-$N_T$ communicate with respective ones of the outputs 606 and inputs of respective P2S modules 612-1, 612-2, ..., 612-$N_T$. The complex gain modules 608 apply corresponding gains $c_1[n], c_2[n], \ldots, c_{Nt}[n]$, referred to collectively as gains $c_t[n]$, to the corresponding coded data streams of each RF channel 604.

The methods of FIGS. 9-12 can be used to determine the gains $c_t[n]$ by substituting N=1. The variable n is a time index that is incremented each time a new set of gains $c_t[n]$ are determined. The methods can be executed periodically by the complex gain modules 608 and/or a microprocessor in the PHY 600. When the methods are executed, the gains $c_t[n]$ should be applied to the corresponding complex gain modules 608 prior to the complex gain modules 608 receiving a frame vis-à-vis the coded data symbols from the mapping module 602.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A physical layer device, comprising:
    a mapping module configured to map a plurality of data streams to a plurality of transmit antennas, wherein each transmit antenna is associated with a respective radio frequency channel of a plurality of radio frequency channels;
    a first gain module configured to
        communicate with a first transmit antenna of the plurality of transmit antennas,
        receive a first plurality of signals generated based on the plurality of data streams, and
        apply a first complex gain to each of the first plurality of signals,
        wherein the first complex gain corresponds to the first transmit antenna; and
    a second gain module configured to
        communicate with a second transmit antenna of the plurality of transmit antennas,
        receive a second plurality of signals generated based on the plurality of data streams, and
        apply a second complex gain to each of the second plurality of signals,
        wherein the second complex gain corresponds to the second transmit antenna,
    wherein the second plurality of signals is different than the first plurality of signals, and
    wherein the second complex gain is different than the first complex gain.

2. The physical layer device of claim 1, wherein:
    each of the first plurality of signals is different; and
    each of the second plurality of signals is different.

3. The physical layer device of claim 1, wherein the mapping module is configured to:
    map the plurality of data streams to the plurality of transmit antennas in accordance with a mapping matrix, and
    based on the mapping matrix, generate (i) the first plurality of signals and (ii) the second plurality of signals.

4. The physical layer device of claim 3, wherein the mapping matrix is a unitary matrix.

5. The physical layer device of claim 1, further comprising:
    a cyclic delay module configured to add a cyclic delay to a plurality of outputs generated by the second gain module,
    wherein the cyclic delay simulates spatial diversity between the plurality of transmit antennas.

6. The physical layer device of claim 1, wherein (i) the first complex gain and (ii) the second complex gain each comprises an amplitude gain and a phase shift.

7. The physical layer device of claim 6, wherein the phase shifts are uniformly distributed over an interval of $2\pi$ radians.

8. The physical layer device of claim 6, wherein the amplitude gains are uniformly distributed over an interval of [0,1].

9. A method comprising:
    mapping a plurality of data streams to a plurality of transmit antennas of a physical layer device, wherein each transmit antenna is associated with a respective radio frequency channel of a plurality of radio frequency channels;
    receiving a first plurality of signals generated based on the plurality of data streams;
    applying a first complex gain to each of the first plurality of signals, wherein the first complex gain corresponds to a first transmit antenna of the plurality of transmit antennas;
    receiving a second plurality of signals generated based on the plurality of data streams; and
    applying a second complex gain to each of the second plurality of signals, wherein the second complex gain corresponds to a second transmit antenna of the plurality of transmit antennas,
    wherein the second plurality of signals is different than the first plurality of signals, and wherein the second complex gain is different than the first complex gain.

10. The method of claim 9, wherein:
each of the first plurality of signals is different; and
each of the second plurality of signals is different.

11. The method of claim 9, further comprising:
mapping the plurality of data streams to the plurality of transmit antennas in accordance with a mapping matrix; and
based on the mapping matrix, generating (i) the first plurality of signals and (ii) the second plurality of signals.

12. The method of claim 11, wherein the mapping matrix is a unitary matrix.

13. The method of claim 9, further comprising:
generating a plurality of outputs in response to applying the second complex gain to each of the second plurality of signals; and
adding a cyclic delay to the plurality of outputs,
wherein the cyclic delay simulates spatial diversity between the plurality of transmit antennas.

14. The method of claim 9, wherein:
the first complex gain and second complex gain each comprises an amplitude gain and a phase shift;
the phase shifts are uniformly distributed over an interval of $2\pi$ radians; and
the amplitude gains are uniformly distributed over an interval of [0,1].

15. A computer program tangibly stored on a non-transitory computer readable medium, the computer program being executable by a processor and comprising instructions for:
mapping a plurality of data streams to a plurality of transmit antennas of a physical layer device, wherein each transmit antenna is associated with a respective radio frequency channel of a plurality of radio frequency channels;
receiving a first plurality of signals generated based on the plurality of data streams;
applying a first complex gain to each of the first plurality of signals, wherein the first complex gain corresponds to a first transmit antenna of the plurality of transmit antennas;
receiving a second plurality of signals generated based on the plurality of data streams; and
applying a second complex gain to each of the second plurality of signals, wherein the second complex gain corresponds to a second transmit antenna of the plurality of transmit antennas,
wherein the second plurality of signals is different than the first plurality of signals, and
wherein the second complex gain is different than the first complex gain.

16. The computer program of claim 15, wherein:
each of the first plurality of signals is different; and
each of the second plurality of signals is different.

17. The computer program of claim 15, further comprising instructions for:
mapping the plurality of data streams to the plurality of transmit antennas in accordance with a mapping matrix; and
based on the mapping matrix, generating (i) the first plurality of signals and (ii) the second plurality of signals.

18. The computer program of claim 17, wherein the mapping matrix is a unitary matrix.

19. The computer program of claim 15, further comprising instructions for:
generating a plurality of outputs in response to applying the second complex gain to each of the second plurality of signals; and
adding a cyclic delay to the plurality of outputs,
wherein the cyclic delay simulates spatial diversity between the plurality of transmit antennas.

20. The computer program of claim 15, wherein:
the first complex gain and second complex gain each comprises an amplitude gain and a phase shift;
the phase shifts are uniformly distributed over an interval of $2\pi$ radians; and
the amplitude gains are uniformly distributed over an interval of [0,1].

* * * * *